United States Patent
Weisgross et al.

(10) Patent No.: US 10,956,533 B1
(45) Date of Patent: Mar. 23, 2021

(54) SYSTEM, METHOD, AND COMPUTER PROGRAM FOR REAL-TIME HTML RENDERING OF WINDOWS APPLICATIONS

(71) Applicant: Amdocs Development Limited, Limassol (CY)

(72) Inventors: Ron Shimon Weisgross, Haifa (IL); Nir Mizrahi, Hod-Hasharon (IL)

(73) Assignee: AMDOCS DEVELOPMENT LIMITED, Limassol (CY)

(*) Notice: Subject to any disclaimer, the term of this patent is extended or adjusted under 35 U.S.C. 154(b) by 15 days.

(21) Appl. No.: 16/358,286

(22) Filed: Mar. 19, 2019

Related U.S. Application Data

(60) Provisional application No. 62/645,694, filed on Mar. 20, 2018.

(51) Int. Cl.
| | | |
|---|---|---|
| *G06F 16/958* | (2019.01) | |
| *H04L 29/08* | (2006.01) | |
| *G06F 16/953* | (2019.01) | |
| *G06F 9/455* | (2018.01) | |

(52) U.S. Cl.
CPC ........ *G06F 16/972* (2019.01); *G06F 9/45558* (2013.01); *G06F 16/953* (2019.01); *H04L 67/025* (2013.01); *H04L 67/16* (2013.01); *G06F 2009/4557* (2013.01); *G06F 2009/45562* (2013.01); *G06F 2009/45595* (2013.01)

(58) Field of Classification Search
CPC .. G06F 16/972; G06F 16/953; G06F 9/45558; G06F 2009/45562; G06F 2009/4557; G06F 2009/45595; G06F 40/14; G06F 40/117; H04L 67/025; H04L 67/16
See application file for complete search history.

(56) References Cited

U.S. PATENT DOCUMENTS

| | | | |
|---|---|---|---|
| 7,765,254 B2 | 7/2010 | Hariharan et al. | |
| 9,794,304 B2 | 10/2017 | Fallows et al. | |
| 9,838,502 B2 | 12/2017 | Croft | |
| 2002/0178290 A1* | 11/2002 | Coulthard | H04L 29/06 709/246 |
| 2004/0205612 A1* | 10/2004 | King | G06F 40/14 715/235 |
| 2012/0151372 A1* | 6/2012 | Kominac | G06F 9/452 715/740 |
| 2016/0028688 A1* | 1/2016 | Chizhov | H04L 63/0853 726/12 |
| 2017/0075880 A1* | 3/2017 | Wang | G06F 16/9577 |
| 2017/0344218 A1 | 11/2017 | Jann et al. | |

* cited by examiner

*Primary Examiner* — Muhammad Raza
(74) *Attorney, Agent, or Firm* — Zilka-Kotab, P.C.

(57) ABSTRACT

A system, method, and computer program product are provided for real-time HTML rendering of desktop applications. In operation, a system identifies one or more desktop based legacy system applications for transforming into one or more HTML based applications in real-time. The system queries user interface (UI) elements of the one or more desktop based legacy system applications. The system maps the UI elements of the one or more desktop based legacy system applications to HTML UI elements associated with the one or more HTML based applications. Additionally, the system opens a web-socket between the HTML UI elements and the UI elements associated with the one or more desktop based legacy system applications to transfer data and events based on user actions in the one or more HTML based applications and responses from the one or more desktop based legacy system applications.

3 Claims, 5 Drawing Sheets

SYSTEM, METHOD, AND COMPUTER PROGRAM FOR REAL-TIME HTML RENDERING OF WINDOWS APPLICATIONS

RELATED APPLICATIONS

The present application claims priority to U.S. Provisional Application No. 62/645,694, entitled "SYSTEM, METHOD, AND COMPUTER PROGRAM FOR REAL-TIME HTML RENDERING OF WINDOWS APPLICATIONS," filed on Mar. 20, 2018, the entire contents of which is incorporated herein by reference.

FIELD OF THE INVENTION

The present invention relates to migrating from legacy systems to modern development platforms, and more particularly to real-time HTML rendering of Windows applications.

BACKGROUND

A legacy system, in the context of computing, refers to an outdated computer system, programming language, or application software that is being used. Currently, there are many companies that rely on legacy system technologies, and even though it is strongly advisable for these companies to set a clear strategy to migrate from legacy system applications to modern development platforms, these companies still find it inefficient and risky to migrate from legacy system technology to modern technologies. This may be due to many reasons, including regression in functionality, security aspects, lost productivity, disruption to the business, costs, and other uncertainties. In addition, exposing legacy system screens to remote locations such as retail stores involves purchasing and implementing third party solutions for virtualization.

Today, there are various existing approaches to move away from legacy system technology. This includes performing a re-write, buying a new product, and tool based migration. Each of these approaches has its own risks, return on investment, cost, and learning curve.

There is thus a need for addressing these and/or other issues associated with the prior art.

SUMMARY

A system, method, and computer program product are provided for real-time HTML rendering of desktop applications. In operation, a system identifies one or more desktop based legacy system applications for transforming into one or more HTML based applications in real-time. The system queries user interface (UI) elements of the one or more desktop based legacy system applications. The system maps the UI elements of the one or more desktop based legacy system applications to HTML UI elements associated with the one or more HTML based applications. Additionally, the system opens a web-socket between the HTML UI elements and the UI elements associated with the one or more desktop based legacy system applications to transfer data and events based on user actions in the one or more HTML based applications and responses from the one or more desktop based legacy system applications.

DETAILED DESCRIPTION

Figure 1:
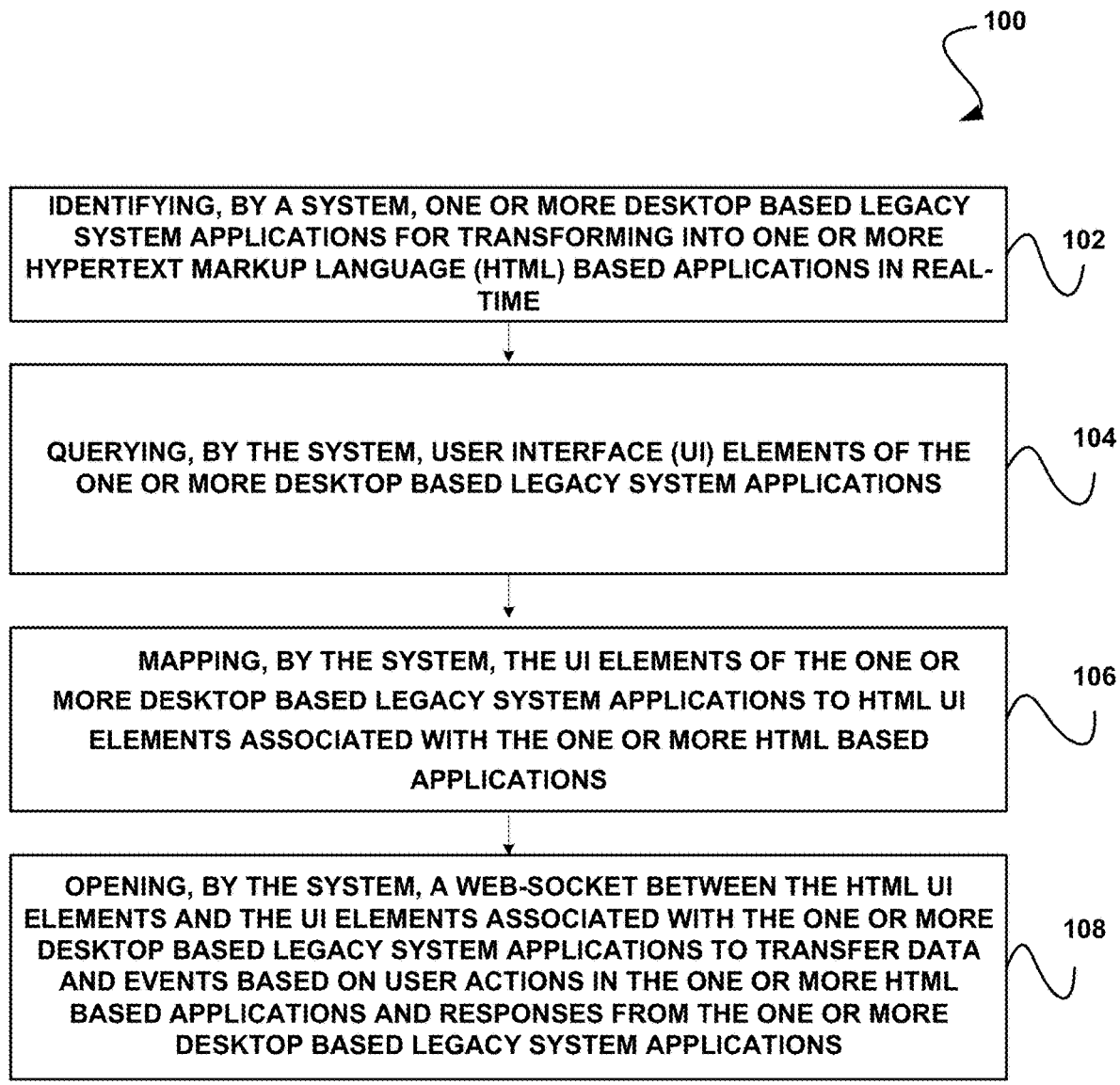
FIG. 1 illustrates a method for real-time hypertext markup language (HTML) rendering of Windows applications, in accordance with one embodiment.

FIG. 1 illustrates a method 100 for real-time hypertext markup language (HTML) rendering of Windows applications, in accordance with one embodiment.

In operation, a system identifies one or more desktop based legacy system applications for transforming into one or more HTML based applications in real-time. See operation 102. In one embodiment, the desktop may include Windows® operating system.

The system queries user interface (UI) elements of the one or more desktop based legacy system applications. See operation 104.

The system maps the UI elements of the one or more desktop based legacy system applications to HTML UI elements associated with the one or more HTML based applications. See operation 106.

Additionally, the system opens a web-socket between the HTML UI elements and the UI elements associated with the one or more desktop based legacy system applications to transfer data and events based on user actions in the one or more HTML based applications and responses from the one or more desktop based legacy system applications. See operation 108.

It should be noted that the method 100 may be implemented utilizing various systems, hardware, software, applications, user interfaces, etc., as dictated by the implementer. For example, the system implementing the method 100 may include one or more processors, databases, etc., as well as implement various logic, computer code, applications, and/or user interfaces, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
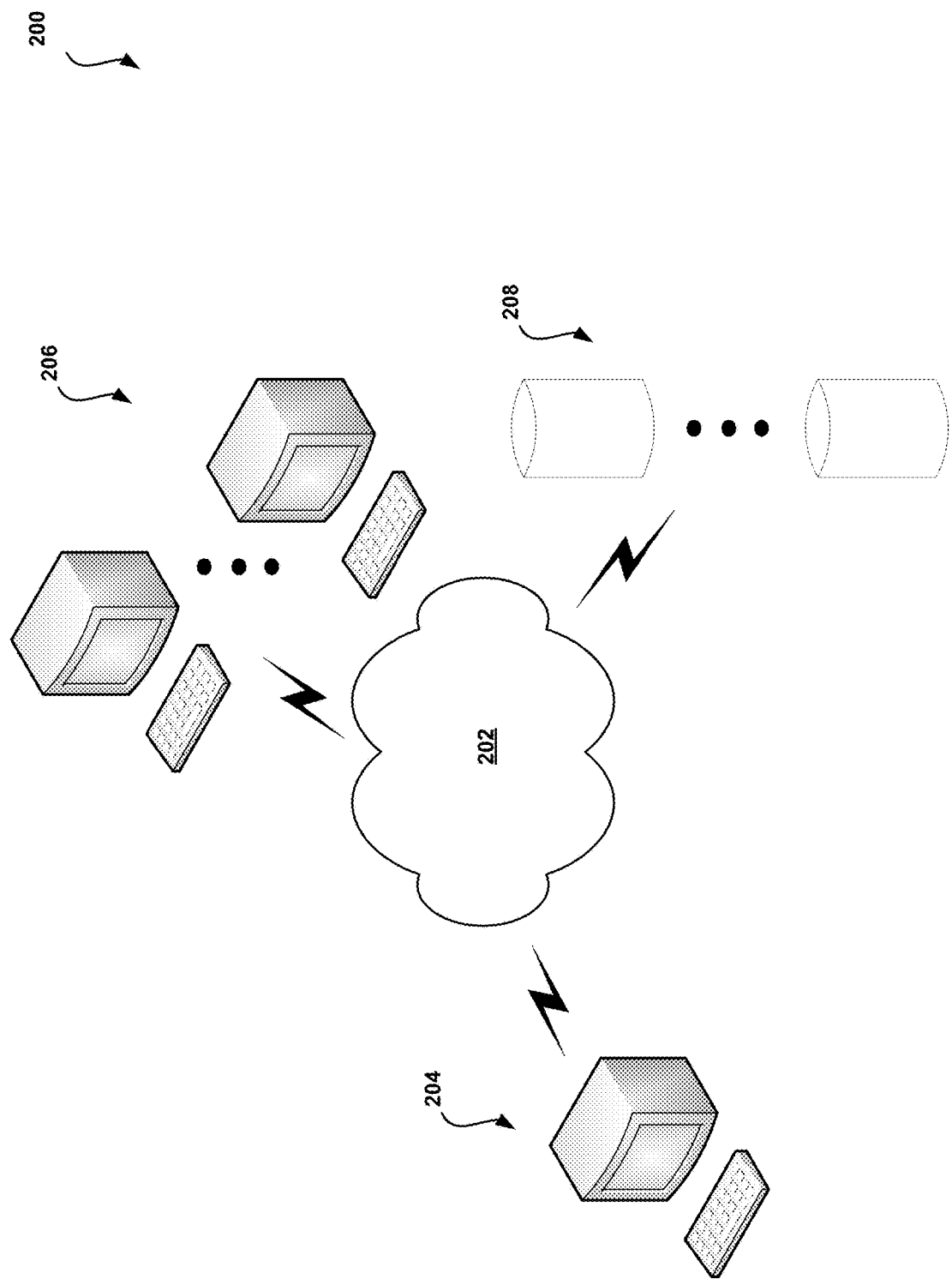
FIG. 2 shows a system for real-time HTML rendering of Windows applications, in accordance with one embodiment.

FIG. 2 shows a system 200 for real-time HTML rendering of Windows applications, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, the system 200 includes a system 204, which may implement a variety of applications or software, etc. The system 204 may be capable of communicating with a plurality of systems 206 (e.g. legacy systems, etc.), either directly or over one or more networks 202, for performing real-time HTML rendering of Windows applications. The system 204 may also be in communication with one or more repositories/databases 208.

The system 204 may be utilized to transform legacy system applications into Web/HTML based applications in real-time. The system 204 achieves this by using interoperability (InterOps) and UI automation technology, data sharing, and events over events channel.

Windows UI elements expose common properties such as: an object model and functions that make it easy for client applications to receive events, retrieve property values, and manipulate UI elements; a core infrastructure for finding and fetching across process boundaries; a set of interfaces for providers to express the tree structure, general properties, and functionality of UI elements; and a control type property that allows clients and providers to clearly indicate the common properties, functionality, and structure of a UI object.

By utilizing this technology, the system 204 may query all of the UI attributes of a legacy system application and map them correctly to a Web/HTML versions in order to transform Windows based UI elements to Web/HTML UI elements. On top of that, the system 204 opens a web-socket between the Web/HTML version of the application and the original Windows based application to transfer data and events based on user actions in the Web/HTML version and responses from the original Windows based application.

Figure 3:
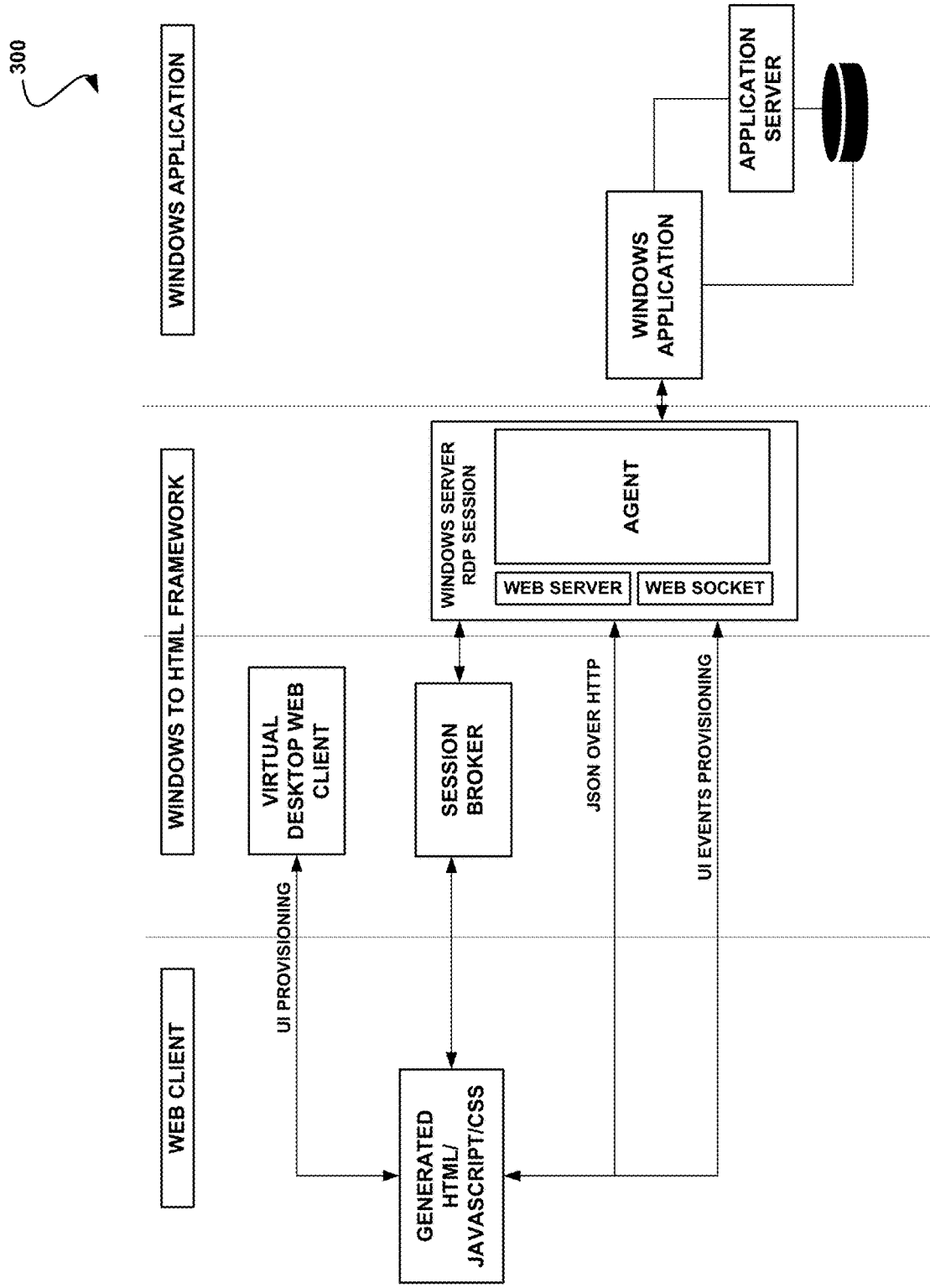
FIG. 3 shows a system architecture for real-time HTML rendering of Windows applications, in accordance with one embodiment.

FIG. 3 shows a system architecture 300 for real-time HTML rendering of Windows applications, in accordance with one embodiment. As an option, the system architecture 300 may be implemented in the context of the details of the previous figures and/or any subsequent figure(s). Of course, however, the system architecture 300 may be implemented in the context of any desired environment. Further, the aforementioned definitions may equally apply to the description below.

The system provides real-time HTML rendering of Windows applications. This includes the ability to expose a Windows application as a fully functional Web/HTML web site.

In one embodiment, the system may include three components, including an agent, a web client, and a broker. In this case, an agent refers to the engine that controls the source Windows application, queries the UI elements, listens to Windows events, and communicates with the web client using a real-time bi-directional web socket events channel.

Client to server events include events coming from the web client that are being executed on the running application. Server to client events include events coming from the running application that are being sent to the client for processing.

In one embodiment, the web client may include a single page web application that contains the logic for managing a virtual desktop for the user, receives a payload of UI elements metadata from the agent, and renders the application UI elements into HTML to reflect the exact same UI structure of the original application while enabling styling. The web client is the framework for starting an application instance, refreshing the UI, stopping the application process and controlling the web socket event channel (connect, disconnect, and event processing). In addition, the web client hosts the Web/HTML version of the source application, allowing the end user to operate the source application seamlessly.

In one embodiment, the broker may control the remote sessions and a session pool. The broker may perform the handshake between the web client and the agent, as well as session initiation and termination. The broker may create an initial headless remote desktop session pool and allocate a session from the pool based on user request.

The broker may also run sessions behind the scene with a fully functional Windows UI running in headless mode. In other words, the remote desktop session may not be displayed on any users' desktop, as the broker is impersonating a real but invisible user desktop. The broker may execute the agent on the remote desktop session and communicate with the agent for monitoring and health checks.

Current existing solutions do not provide a Web/HTML UI on the fly and therefore cannot make use of the flexibility and versatility of web technologies. The system described herein renders any Windows application using standard HTML5, which can be opened on any standard web browser without the need to install any dedicated commercial expensive client. The system allows for responsive frameworks and to mobilize the application to be operated from any mobile device.

More information and other embodiments associated with real-time HTML rendering of Windows applications may be found in Appendix A.

Figure 4:
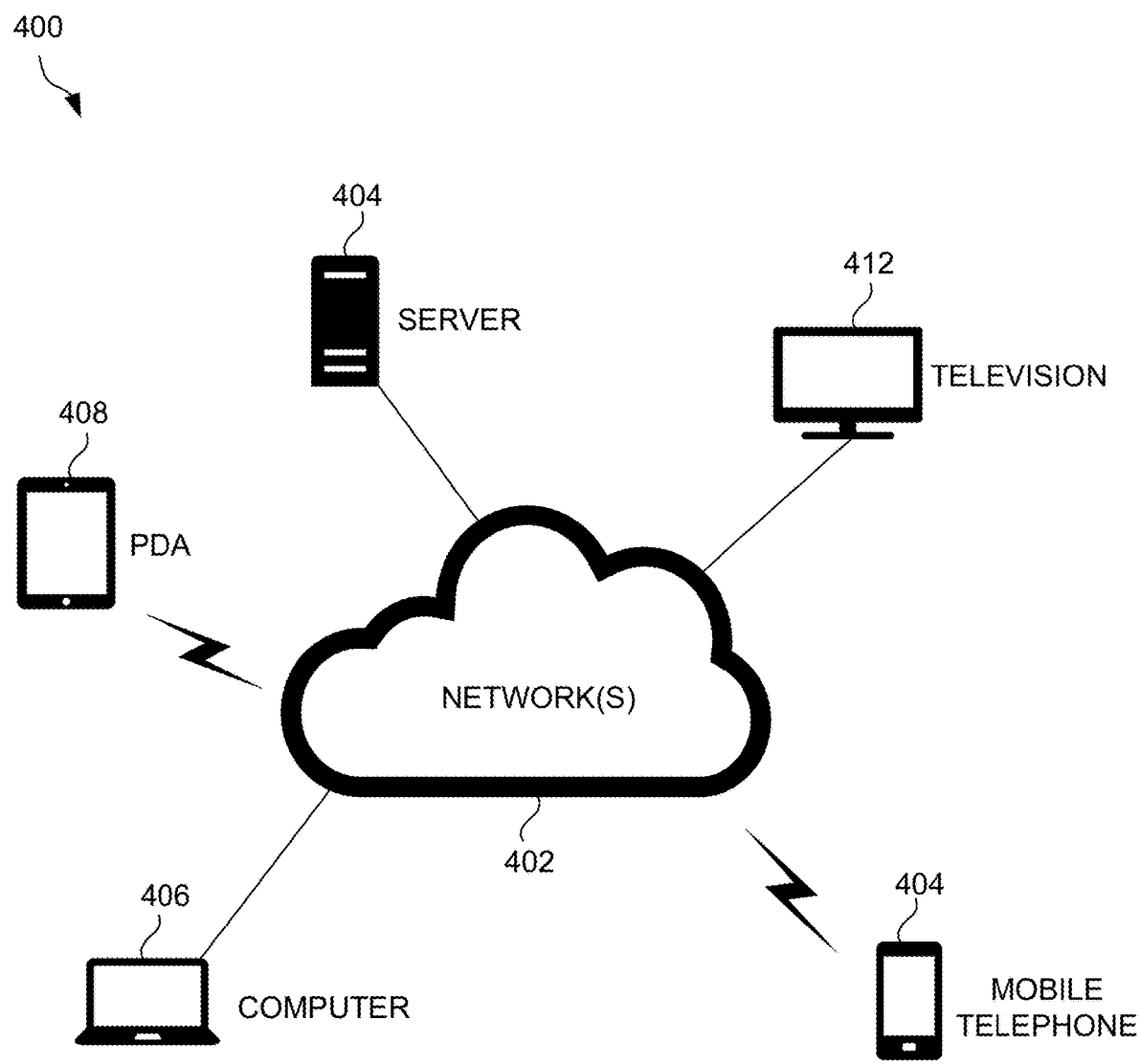
FIG. 4 illustrates a network architecture, in accordance with one possible embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

Figure 5:
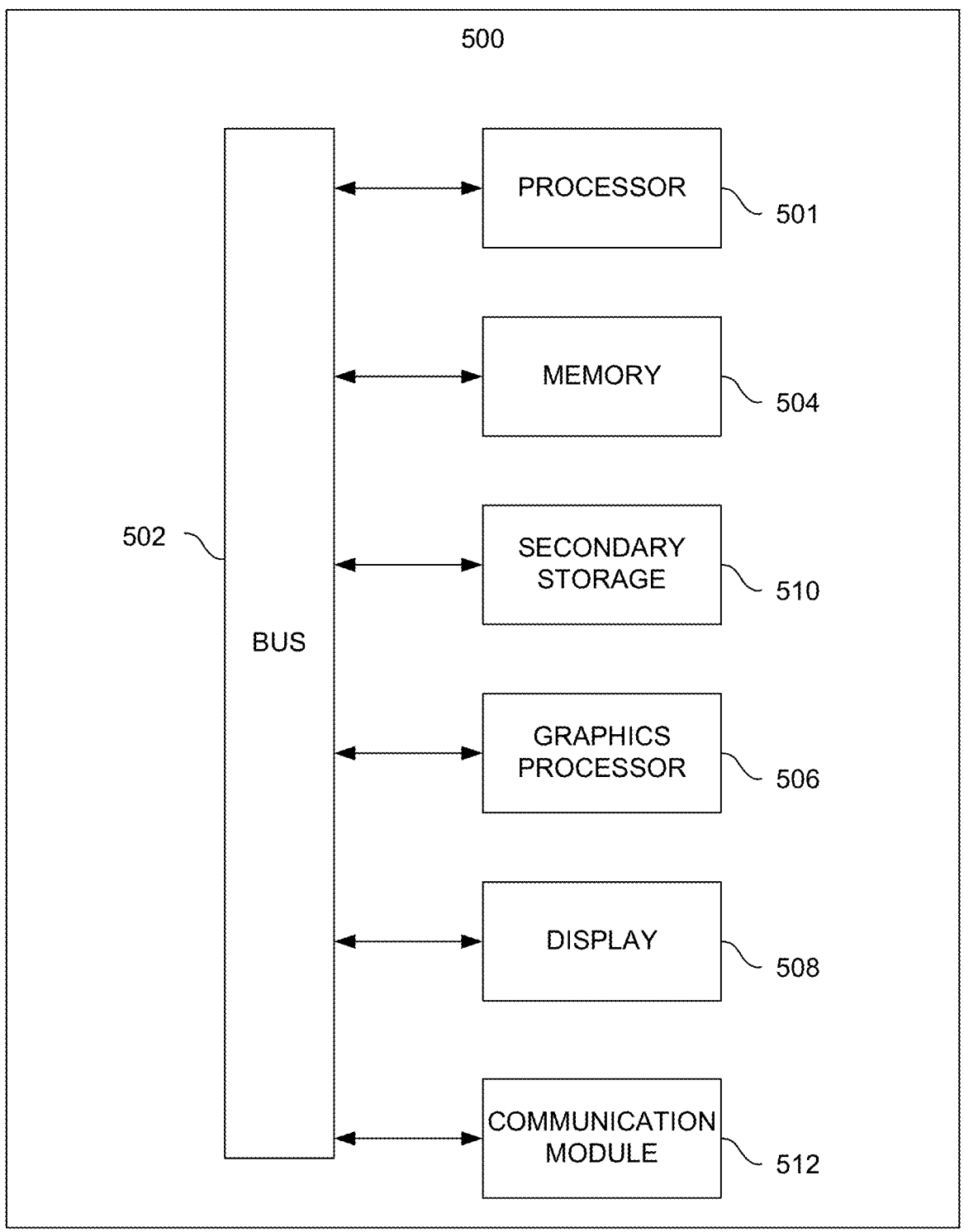
FIG. 5 illustrates an exemplary system, in accordance with one embodiment.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of non-transitory computer-readable media.

The system 500 may also include one or more communication modules 512. The communication module 512 may be operable to facilitate communication between the system 500 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
identifying, by a system that includes a processor and memory, a desktop based legacy system application for transforming into a hypertext markup language (HTML) based application in real-time, wherein the HTML based application uses HTML5;
querying, by the system, user interface (UI) elements of the desktop based legacy system application to retrieve a tree structure, general properties, and functionality of the UI elements of the desktop based legacy system application;
mapping, by the system, the UI elements of the desktop based legacy system application to HTML UI elements that are HTML versions of the UI elements of the desktop based legacy system application, wherein a structure of the HTML UI elements mirrors a structure of the desktop based legacy system application;
using, by the system, a broker to perform a handshake between a web client that manages a virtual desktop and an agent that controls the desktop based legacy system application;
providing, by the system, real-time HTML rendering of the desktop based legacy system application as the HTML based application, using the HTML UI elements, including:
providing to the web client from the agent, by the system, a payload of UI elements metadata for rendering the UI elements into HTML, and
opening, by the system, a bi-directional web-socket events channel between the HTML UI elements and the UI elements associated with the desktop based legacy system application to:
transfer data and events based on user actions in the HTML based application to the desktop based legacy system application, and
transfer responses from the desktop based legacy system application to the HTML based application.

2. A computer program product comprising a non-transitory computer readable medium storing computer executable instructions, the computer executable instructions when executed by a processor instructs the processor to:
identify a desktop based legacy system application for transforming into a hypertext markup language (HTML) based application in real-time, wherein the HTML based application uses HTML5;
query user interface (UI) elements of the desktop based legacy system application to retrieve a tree structure, general properties, and functionality of the UI elements of the desktop based legacy system application;
map the UI elements of the desktop based legacy system application to HTML UI elements that are HTML versions of the UI elements of the desktop based legacy system application, wherein a structure of the HTML UI elements mirrors a structure of the desktop based legacy system application;
use a broker to perform a handshake between a web client that manages a virtual desktop and an agent that controls the desktop based legacy system application;
provide real-time HTML rendering of the desktop based legacy system application as the HTML based application, using the HTML UI elements, including:
providing to the web client from the agent a payload of UI elements metadata for rendering the UI elements into HTML, and
opening a bi-directional web-socket events channel between the HTML UI elements and the UI elements associated with the desktop based legacy system application to:
transfer data and events based on user actions in the HTML based application to the desktop based legacy system application, and
transfer responses from the desktop based legacy system application to the HTML based application.

3. A device, comprising:
a non-transitory memory storing instructions; and
one or more processors in communication with the non-transitory memory, wherein the one or more processors execute the instructions to:
identify a desktop based legacy system application for transforming into a hypertext markup language (HTML) based application in real-time, wherein the HTML based application uses HTML5;
query user interface (UI) elements of the desktop based legacy system application to retrieve a tree structure, general properties, and functionality of the UI elements of the desktop based legacy system application;
map the UI elements of the desktop based legacy system application to HTML UI elements that are HTML versions of the UI elements of the desktop based legacy system application, wherein a structure of the HTML UI elements mirrors a structure of the desktop based legacy system application;
use a broker to perform a handshake between a web client that manages a virtual desktop and an agent that controls the desktop based legacy system application;
provide real-time HTML rendering of the desktop based legacy system application as the HTML based application, using the HTML UI elements, including:
providing to the web client from the agent a payload of UI elements metadata for rendering the UI elements into HTML, and
opening a bi-directional web-socket events channel between the HTML UI elements and the UI elements associated with the desktop based legacy system application to:
transfer data and events based on user actions in the HTML based application to the desktop based legacy system application, and
transfer responses from the desktop based legacy system application to the HTML based application.

* * * * *